United States Patent [19]
Lederman

[11] Patent Number: 5,195,807
[45] Date of Patent: Mar. 23, 1993

[54] VENTING WHEEL BEARING END CAP

[75] Inventor: Frederick E. Lederman, Sandusky, Ohio

[73] Assignee: General Motors Corporation, Detroit, Mich.

[21] Appl. No.: 870,846

[22] Filed: Apr. 20, 1992

[51] Int. Cl.$^5$ .............................................. B60B 7/00
[52] U.S. Cl. ................................ 301/108.1; 301/108.3
[58] Field of Search ............ 301/37 R, 37 TP, 37 PB, 301/108 R, 108 A, 108 TW, 124 R, 126, 131

[56] References Cited

U.S. PATENT DOCUMENTS

| | | | |
|---|---|---|---|
| 3,003,834 | 10/1961 | Pendleton | 308/187.1 |
| 3,169,809 | 2/1965 | Pendleton | 308/187.1 |
| 3,734,579 | 5/1973 | Schumacher | 301/108 A X |
| 3,893,690 | 7/1975 | Yapp | 301/108 A |
| 4,190,133 | 2/1980 | Ploeger | 301/108 R X |
| 4,399,998 | 8/1983 | Otto | 277/134 |
| 4,421,326 | 12/1983 | Drygalski | 277/50 |
| 4,880,281 | 11/1989 | Merkelbach | 301/124 R |

*Primary Examiner*—Russell D. Stormer
*Attorney, Agent, or Firm*—Patrick M. Griffin

[57] ABSTRACT

A wheel bearing end cap is integrally molded from plastic, and is vented so that it will not be blown out of the wheel hub due to pressure fluctuations. A conical depression in the center section of the cap includes an integral fracture line that breaks and vents upon the first experience fluctuation, and thereafter. The vent is protected by its inset, sheltered location. The molded depression is also sheltered within a tail stock hole in the center of the bearing spindle, so that the extra space necessary for the molded in depression does not add to the overall size of the package.

2 Claims, 3 Drawing Sheets

VENTING WHEEL BEARING END CAP

This invention relates to wheel bearing end caps in general, and specifically to such an end cap that contains a protected pressure equalizing vent.

BACKGROUND OF THE INVENTION

Vehicle wheel bearings generally consist of a spindle surrounded by a generally cylindrical hub and held apart by a double row of rolling elements, such as bearing balls. Each end of the annular space that contains the balls must be sealed, both to retain lubricant and to exclude outside contaminants. The seals also must be able to stand up to the internal pressure fluctuations that the bearing experiences. The bearing space heats up with operation, especially due to brake waste heat, which tends to force air and lubricant out. As it cools down, it can experience a pressure depression, which tends to draw air and contaminants in from outside.

With trailing, nonpowered wheels, the spindle need not extend very far past the end of the hub, unlike the central drive shaft of a powered wheel. Therefore, the seal at the inboard side of the space can be an end cap, which does not rub on the spindle or create any seal friction. One drawback to a cap, however, is that its large surface area, compared to a smaller rubbing seal, can be strongly acted on by an internal pressure fluctuation. This is even more of a problem for a plastic end cap, which cannot be press or friction fitted into a hub with the same force that a metal cap can. Excess pressure could potentially blow it out, and negative pressure could bow it in. Vented plastic end caps are known. However, room for improvement exists in terms of simplicity and compactness, and in terms of protecting the vent from damage and from outside contaminants.

SUMMARY OF THE INVENTION

The invention provides a venting plastic bearing end cap effective to equalize pressure fluctuations that has a protected vent, and which is particularly compact.

In the preferred embodiment disclosed, the venting end cap is incorporated in a trailing wheel bearing in which the spindle terminates near the edge of the surrounding cylindrical hub. The inboard end of the spindle is machined by a process that leaves a generally conical tail stock hole at the center. The end cap is a one-piece plastic molding with an outer rim that press fits into the edge of the wheel hub, to which it latches and seals securely. The center section of the cap is molded with a truncated conical depression that extends partially into the tail stock hole, but without touching the spindle. Integrally molded into the base of the conical depression is a vent in the form of a fracture line. When the cap first sees a pressure differential, the fracture line responds by breaking, then parting to either vent pressure or draw in make up air. The inset location of the vent assures that it is sheltered protected from water and impact damage. The fact that the conical depression that provides the protective inset extends partially into the already existing tail stock hole means that the cap itself need not extend axially past the envelope that a conventional end cap would occupy.

It is, therefore, a general object of the invention to provide a venting wheel bearing end cap of simple and compact construction with a protected, sheltered vent that is responsive to internal pressure fluctuations.

It is another object of the invention to provide such an end cap in which the vent includes a fracture line molded integrally at the bottom of a sheltering conical depression.

It is still another object of the invention to provide such an end cap in which the sheltering depression itself is sheltered within a tail stock hole in the end of the bearing spindle so as to create a compact arrangement.

It is yet another object of the invention to provide a cap in which the latch means and seal cooperate to maintain retention and seal integrity.

DESCRIPTION OF THE PREFERRED EMBODIMENT

These and other objects and features of the invention will appear from the following written description, and from the drawings, in which.

Figure 1:
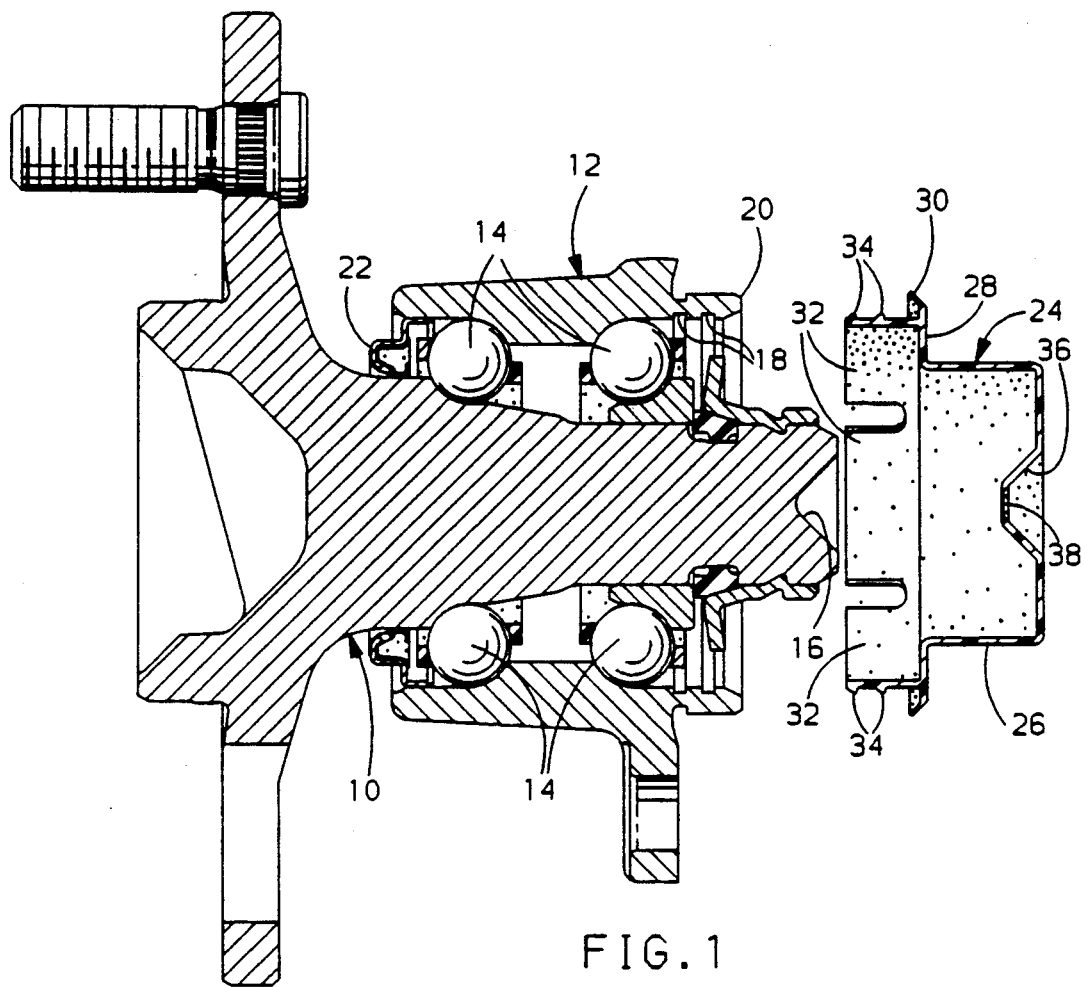
FIG. 1 is a cross sectional view of a wheel bearing and end cap according to the invention, before installation.

Referring first to FIG. 1, the invention is incorporated in a trailing vehicle wheel bearing, which consists of a rotatable central spindle, indicated generally at (10), a surrounding cylindrical hub, indicated generally at (12), and a double row of bearing balls (14), which support hub (12) on spindle (10). A nonillustrated wheel is mounted to the outboard end of spindle (10), and the inboard end terminates just past the edge of hub (12). A pre-existing concavity in the form of a conical tail stock hole (16) remains at the center of the inboard end of spindle (10), left over from the machining process. Tail stock hole (16) provides a plain bearing on which spindle (10) rotates as it is turned down. It typically provides no function at all after the turning process is finished. Hub (12) is conventional, but for a double groove (18) turned into its inside surface near the outboard edge, and an extra, outboard chamfer (20) of about 45 degrees ground on the outer corner of the outboard edge. A conventional rubbing seal (22) fills the outboard end of the annular space between spindle (10) and hub (12). The other end is sealed by a preferred embodiment of the venting end cap of the invention, indicated generally at (24).

Figure 2:
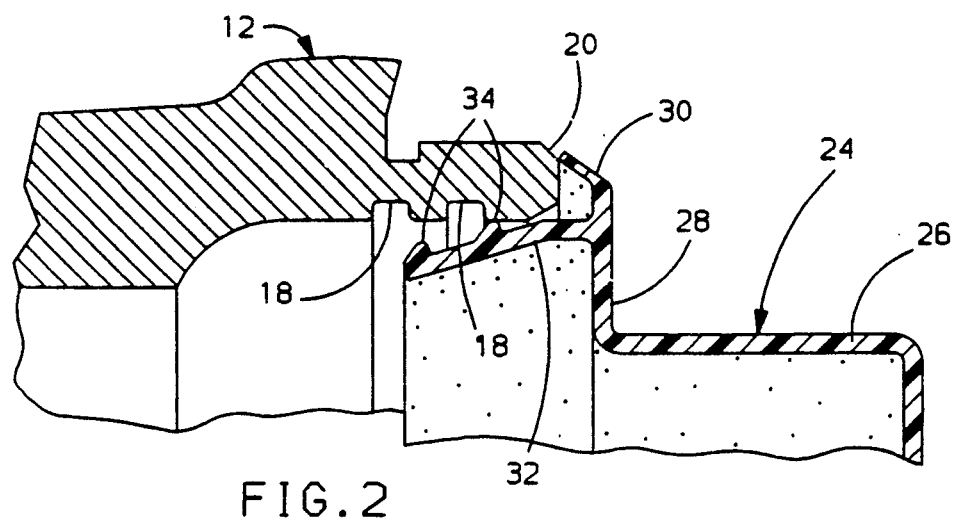
FIG. 2 is an enlarged view of a portion of the edge of the hub and cap showing the cap in the process of being installed.
Figure 3:
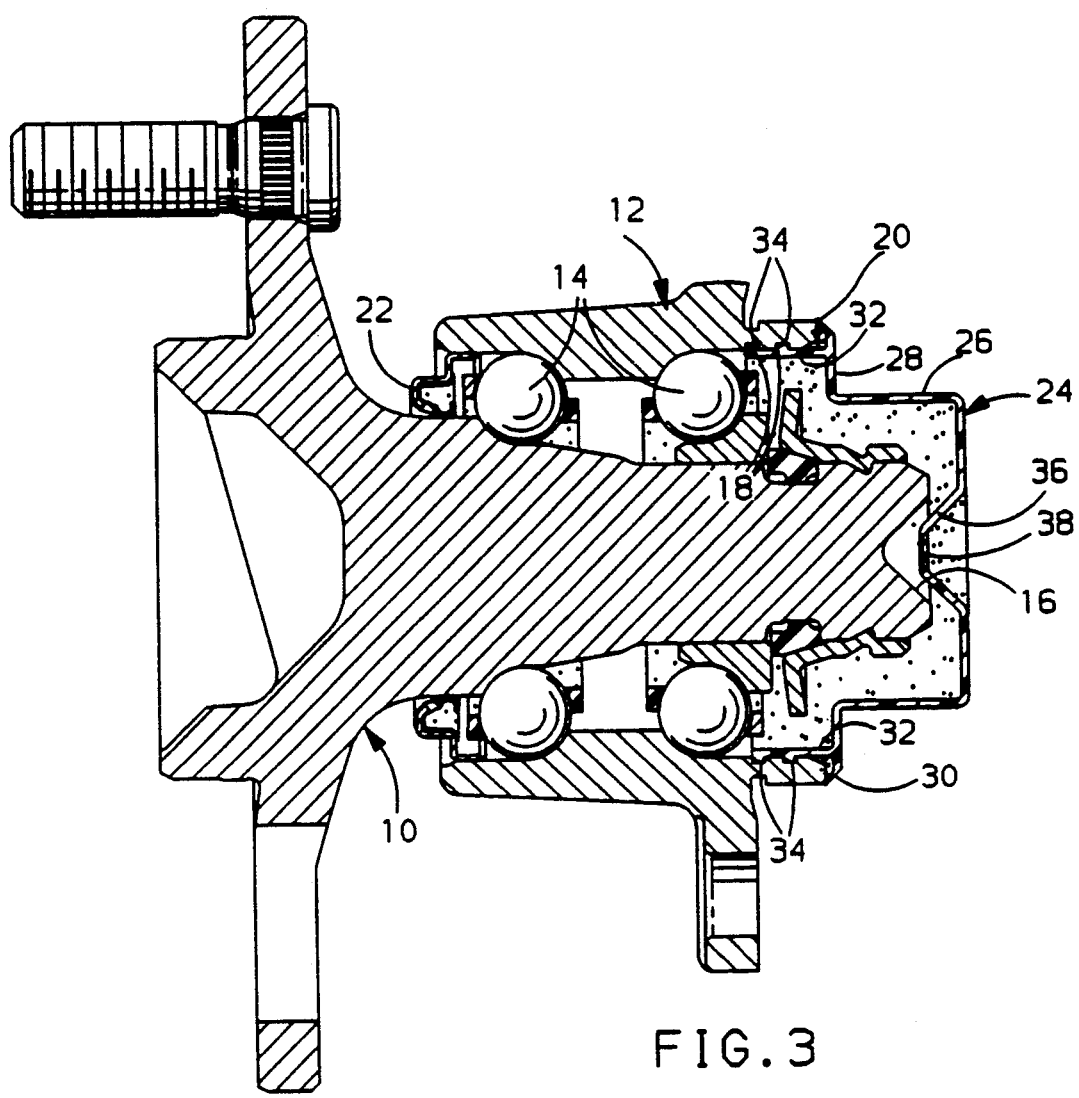
FIG. 3 is a view like FIG. 2, but showing the cap fully installed.
Figure 4:
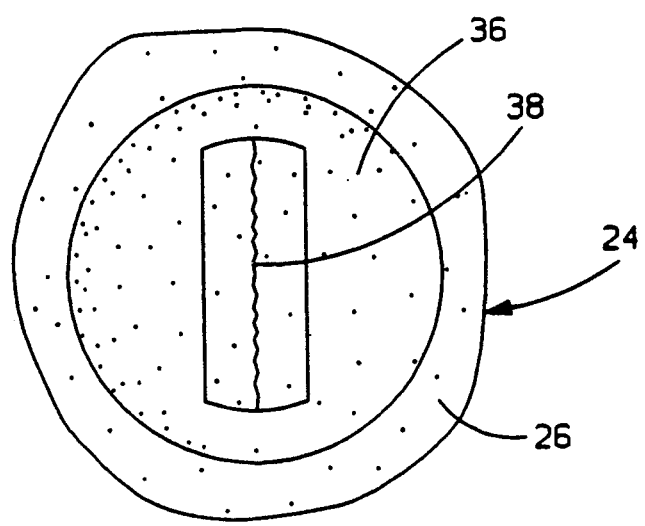
FIG. 4 is an enlarged view looking into the conical depression and showing the vent closed.

Referring next to FIGS. 1, 2 and 4, the details of cap (24) are described. Cap (24) is integrally molded of a suitable plastic, such as one of the new flexible nylons that have become commercially available. Cap (24) has a generally stepped cylindrical shape, with a center cup section (26) that surrounds, but does not touch, the inboard end of spindle (10), and an annular rim (28) radiating out from cup section (26). A conically extending lip (30) is molded at the terminus of rim (28), which, in its free molded state, rests just inside of the location of hub chamfer (20). A plurality of four evenly spaced, semi-cylindrical leaves (32) extend axially in from the inside of rim (28), each sized to fit tightly inside hub (12). Each leaf (32) is molded with a pair of double ribs

(34) sized to fit tightly inside the internal hub grooves (18). Molded into the center of cup section (26) is a concavity, specifically a truncated conical depression (36), which has a flat bottom and a shape that generally matches the shape of the spindle tail stock hole (16). Molded integrally into the flat bottom of conical depression (36) is a thin vertical fracture line (38). Fracture line (38) bifurcates a thinned portion of the bottom of depression (36) that is thin enough to be flexible. Fracture line (38) is itself even thinner, enough so to split down the center when exposed to a pressure differential of the magnitude likely to be seen within the wheel bearing.

Referring next to FIG. 2, the installation of the invention is illustrated. Cap (24) is installed by pressing it toward and into hub (12), which flexes the four leaves (32) radially inwardly until the ribs (34) latch into the matching grooves (18). When cap (24) is seated, the lip (30) is pulled and held tight against hub chamfer (20) by the ribs (34). The ribs are simultaneously pulled tight against the right hand edges of the grooves (18) by the tension in the lip (30), which is flexed slightly out of its free molded state. The ribs (34) and lip (30) thereby cooperatively serve both as a latch means to retain cap (24) to hub (12), and as a seal, since lip (30) makes continuous, tight contact with chamfer (20). Cap retention is stronger than a simple press or friction fit would provide. Pressure fluctuations will not act to dislodge cap (24) or to break the seal provided by lip (30), as is described next.

Figure 5:
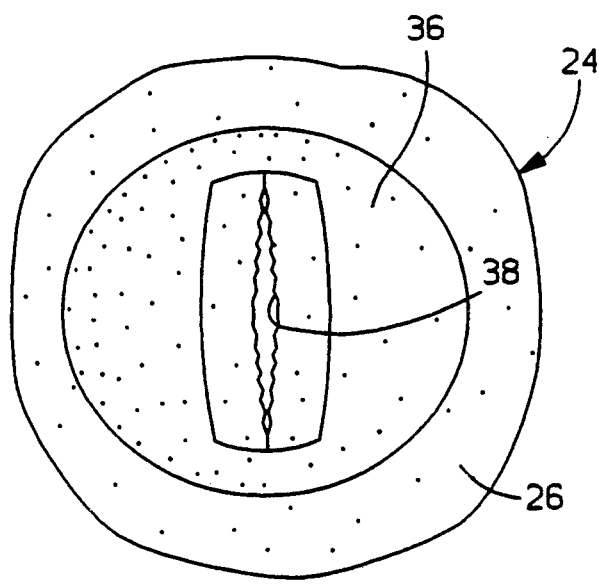
FIG. 5 is a view like FIG. 4 showing the vent open.
Figure 6:
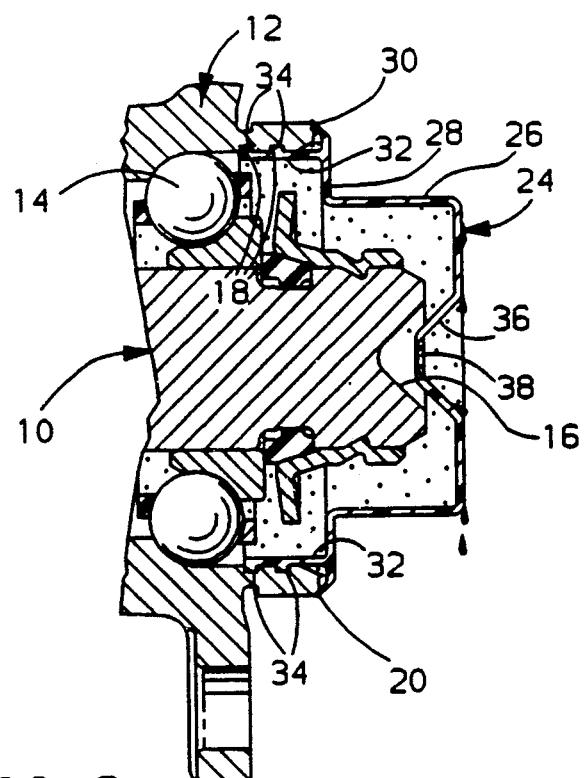
FIG. 6 is a view of just the end of the bearing and the installed cap illustrating how the vent is sheltered and protected.

Referring next to FIGS. 5 and 6, the operation of cap (24) is illustrated. With an increase in internal pressure, the ribs (34) are not pulled from the grooves (18), nor is the lip (30) bent away from the hub chamfer (20). Instead, the fracture line (38) is blown out and broken, as shown in FIG. 5, parting and opening temporarily to vent and equalize the bearing internal pressure. The fracture line (38) closes up tightly again after venting. The same process can and would occur in the case of a pressure depression, with equalizing air being drawn in. The concave shape of conical depression (36) serves several functions. Being recessed, the fracture line (38) is not exposed to impact or puncture. Also, it is not directly exposed to normal water spray or other contaminants, which are shed, as shown in FIG. 6. As seen from inside the cap (24), the depression (36) is convex, so that lubricant would not be likely to collect in or on it, and so would not be expelled in significant amount during venting. The flared, conical shape assures that water or other contaminants would not settle, but would be shed away from fracture line (38). In addition, conical depression (38) can shelter inside of the tail stock hole (16), occupying space that is otherwise unused. The space needed to recess the vent is thereby provided with no need to enlarge the axial length of the central cup section (26). Therefore, a particularly compact package is provided. All the advantages of plastic over steel, including light weight and noncorrosion, are achieved with no loss of seal integrity, and without the potential for seal expulsion that results from pressure build-up.

Variations in the embodiment disclosed could be made. The location of the leaves (32) and lip (30) could be reversed, so that the leaves (32) were received over the outside of the hub (12) and the lip (30) seated against an inner chamfer, rather than the outer chamfer (20). The disclosed design provides more protection for the leaves (32), however. Some venting means other than the integrally molded fracture line (38) could be incorporated at the bottom of conical depression (36), such as a duckbill valve. This would add expense, of course, compared to an integrally molded vent, and the fracture line vent makes particularly good use of the flexible nature of the plastic material. A protective concavity with a different shape could be molded into the center section (26), such as a cylindrical inset. The conical shape disclosed is particularly advantageous, however, because of its ability to shed contaminants from its outer surface and its lack of propensity to collect lubricant on its inner surface. Cap (24) as disclosed could be used in conjunction with a wheel bearing in which the spindle tail stock hole (16) did not exist. However, the center section (26) would have to be longer. The combination of cap (24) as disclosed with the spindle (10) disclosed makes for a particularly compact overall bearing assembly. Therefore, it will be understood that it is not intended to limit the invention to just the embodiment disclosed.

The embodiments of the invention in which an exclusive property or privilege is claimed are defined as follows:

1. An end cap for use in a wheel bearing of the type having a generally cylindrical hub surrounding a central spindle having an end near the edge of said hub, and in which said bearing is subject to an internal pressure fluctuation, said end cap comprising,
   a latch means retaining said cap to said hub,
   a generally cylindrical center section surrounding the end of said spindle, said center section further including a concavity, and,
   a vent located within said concavity and responsive to said pressure fluctuations so as to open and close to equalize the internal pressure,
   whereby said cap is prevented from dislodging by said pressure fluctuations while said vent is protected by being sheltered within said concavity.

2. A wheel bearing of the type that is subject of internal pressure fluctuation, comprising,
   a generally cylindrical hub,
   a central spindle surrounded by said hub and having an end near the edge of said hub, said spindle end further including a central concavity,
   an end cap having a latch means retaining said cap to said hub and a generally cylindrical center section surrounding the end of said spindle,
   said center section further including a concavity extending partially into said spindle end concavity, and,
   a vent located within said concavity and responsive to said pressure fluctuations so as to open and close to equalize the internal pressure,
   whereby said cap is prevented from dislodging by said pressure fluctuations while said vent is protected by being sheltered within said end cap concavity.

* * * * *